(12) United States Patent
Engelhart

(10) Patent No.: US 7,849,013 B2
(45) Date of Patent: Dec. 7, 2010

(54) SECURE ONLINE PURCHASING

(75) Inventor: Robert L. Engelhart, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1117 days.

(21) Appl. No.: 11/105,049

(22) Filed: Apr. 11, 2005

(65) Prior Publication Data

US 2005/0182717 A1     Aug. 18, 2005

Related U.S. Application Data

(63) Continuation of application No. 10/160,656, filed on May 30, 2002, now Pat. No. 7,110,987, which is a continuation-in-part of application No. 10/080,988, filed on Feb. 22, 2002, now Pat. No. 7,007,000.

(51) Int. Cl.
    *G06Q 40/00* (2006.01)
(52) U.S. Cl. ...................................................... 705/44
(58) Field of Classification Search .................. 705/35, 705/36, 37, 38, 39
    See application file for complete search history.

(56) References Cited

U.S. PATENT DOCUMENTS

| | | |
|---|---|---|
| 4,947,028 A | 8/1990 | Gorog |
| 5,715,314 A | 2/1998 | Payne et al. |
| 5,757,917 A | 5/1998 | Rose et al. |
| 5,794,221 A * | 8/1998 | Egendorf ..................... 705/40 |
| 5,826,241 A | 10/1998 | Stein et al. |
| 5,907,831 A | 5/1999 | Lotvin et al. |
| 5,909,492 A | 6/1999 | Payne et al. |
| 5,920,847 A | 7/1999 | Kolling et al. |

(Continued)

FOREIGN PATENT DOCUMENTS

EP          0982674          3/2000

(Continued)

OTHER PUBLICATIONS

Conflict Free Transaction Scheduling using Serialization Graph for Realtime databases, V.C.S. Lee, Kw Lam. , Journal of Sytems and Software, V. 55, No. 1, pp. 57-65. Dec. 1, 2000.*

(Continued)

*Primary Examiner*—Alexander Kalinowski
*Assistant Examiner*—Bruce I Ebersman
(74) *Attorney, Agent, or Firm*—Moazzam & Associates, LLC

(57) ABSTRACT

In a method of purchasing online, a client device of a customer communicates a purchase selection which is received by a vendor computer system. The vendor computer system, in response, communicates a cost of the purchase selection and fund confirmation address to the client device. The client device communicates a payment authorization for the cost that is received by a fund guardian. The client device also communicates biometric information. The fund guardian confirms the availability of sufficient funds to pay the cost. The biometric information is applied along with a stored biometric print to authenticate the customer. The vendor computer system communicates a fund confirmation address which is received by the fund guardian. When sufficient funds are available to pay the cost, and when the customer is authenticated, the fund guardian communicates a fund confirmation to the vendor computer system at the fund confirmation address.

11 Claims, 8 Drawing Sheets

U.S. PATENT DOCUMENTS

| | | | |
|---|---|---|---|
| 5,946,623 A * | 8/1999 | Spradlin | 455/445 |
| 6,023,682 A | 2/2000 | Checchio | |
| 6,029,150 A | 2/2000 | Kravitz | |
| 6,036,344 A | 3/2000 | Goldenberg | |
| 6,067,416 A | 5/2000 | Fraser | |
| 6,118,860 A | 9/2000 | Hillson et al. | |
| 6,188,994 B1 | 2/2001 | Egendorf | |
| 6,206,283 B1 | 3/2001 | Bansal et al. | |
| 6,219,439 B1 | 4/2001 | Burger | |
| 6,246,870 B1 * | 6/2001 | Dent et al. | 455/405 |
| 6,269,348 B1 | 7/2001 | Pare, Jr. et al. | |
| 6,327,578 B1 | 12/2001 | Linehan | |
| 6,477,509 B1 * | 11/2002 | Hammons et al. | 705/27 |
| 6,493,437 B1 | 12/2002 | Olshansky | |
| 6,505,171 B1 * | 1/2003 | Cohen et al. | 705/26 |
| 6,567,794 B1 | 5/2003 | Cordery et al. | |
| 6,975,937 B1 * | 12/2005 | Kantarjiev et al. | 701/117 |
| 7,010,512 B1 * | 3/2006 | Gillin et al. | 705/39 |
| 7,080,048 B1 * | 7/2006 | Sines et al. | 705/75 |
| 7,177,825 B1 * | 2/2007 | Borders et al. | 705/26 |
| 7,475,808 B1 * | 1/2009 | Bishop | 235/379 |
| 7,505,936 B2 * | 3/2009 | Huffman et al. | 705/37 |
| 2001/0007983 A1 | 7/2001 | Lee | |
| 2001/0037254 A1 | 11/2001 | Glikman | |
| 2001/0037264 A1 | 11/2001 | Husemann et al. | |
| 2001/0051924 A1 | 12/2001 | Uberti | |
| 2002/0019811 A1 | 2/2002 | Lapsley et al. | |
| 2002/0029194 A1 * | 3/2002 | Lewis et al. | 705/39 |
| 2002/0052841 A1 | 5/2002 | Guthrie et al. | |
| 2002/0065787 A1 * | 5/2002 | Evers et al. | 705/80 |
| 2002/0073046 A1 * | 6/2002 | David | 705/67 |
| 2002/0077837 A1 * | 6/2002 | Krueger et al. | 705/1 |
| 2002/0087465 A1 * | 7/2002 | Ganesan et al. | 705/39 |
| 2002/0091937 A1 | 7/2002 | Ortiz | |
| 2002/0152179 A1 * | 10/2002 | Racov | 705/67 |
| 2002/0169700 A1 * | 11/2002 | Huffman et al. | 705/35 |
| 2002/0174062 A1 | 11/2002 | Sines et al. | |
| 2002/0178122 A1 * | 11/2002 | Maes | 705/64 |
| 2003/0004881 A1 | 1/2003 | Shinzaki et al. | |
| 2003/0023549 A1 | 1/2003 | Armes et al. | |
| 2003/0031321 A1 | 2/2003 | Mages | |
| 2003/0050833 A1 * | 3/2003 | Hamzy et al. | 705/14 |
| 2003/0074317 A1 * | 4/2003 | Hofi | 705/44 |
| 2003/0083986 A1 * | 5/2003 | Kobayashi | 705/39 |
| 2003/0120615 A1 * | 6/2003 | Kuo | 705/78 |
| 2003/0130959 A1 | 7/2003 | Rosenbaum | |
| 2003/0195935 A1 | 10/2003 | Leeper | |
| 2005/0203835 A1 * | 9/2005 | Nhaissi et al. | 705/39 |

FOREIGN PATENT DOCUMENTS

| | | |
|---|---|---|
| EP | 1020824 | 7/2000 |
| WO | WO 98/19260 | 5/1998 |

OTHER PUBLICATIONS

Annual International Conference of IEEE Engineering in Medicine and Biology Society, Nov. 4-7, 1988, Edited by G. Harris.*

Linear Searching for a Square in a Word, M. Crochemore, Bulletin of the European Association for Theoretical Comptuer Science, No. 24, pp. 66-72, Austria, Oct. 1984.*

Anon., "New Members Join NACHA's Internet Payment Project," *Electronic Payments International*, p. 3 (Jun. 2001).

Anon., "The French Try Shopping on the Run," *Card Technology*, 8 pp., (Mar. 2000).

Anon., printouts from iPIN Web site, 50 pp. [downloaded from the World Wide Web on May 29, 2003].

Francella, "Food-Stamp Handling Made Easy," *Convenience Store News*, p. 54, (Jan. 16, 1995).

Search Report from PCT/US03/04650.

Taaffe, "Lack of Global Standards Spurs Regional Groups . . . But M-Payments Still Need to Be Easier," *CommunicationsWeek International*, No. 267, 15 pp. (Jun. 18, 2001).

* cited by examiner

SECURE ONLINE PURCHASING

RELATED APPLICATIONS

This patent application is a continuation of U.S. patent application Ser. No. 10/160,656, entitled "SECURE ONLINE PURCHASING," filed on May 30, 2002 now U.S. Pat. No. 7,110,987, the disclosure of which is hereby incorporated by reference, which is a continuation-in-part of U.S. patent application Ser. No. 10/080,088, entitled "SECURE ONLINE PURCHASING," filed on Feb. 22, 2002 now U.S. Pat. No. 7,007,000. Priority to the earliest filing date of the above-referenced applications is hereby claimed.

TECHNICAL FIELD

This invention relates to online purchasing. More specifically, the invention relates to purchasing online in a manner that helps ensure the security of a customer's financial data.

BACKGROUND

Customers are increasingly tuning to computer networks, and the Internet in particular, to locate and purchase goods and services. So-called 'online' shopping involves the location and purchase of goods and/or services by way of a network. Increasingly, mobile phones and other wireless devices are being employed to this end.

One problem with conventional online shopping techniques is that they typically involve payment by way of credit or debit cards. To consummate such transactions, sensitive customer financial data is communicated between the customer and the vendor and may be stored electronically by the vendor. This subjects the financial information to theft vulnerabilities. For example, the information may be intercepted by unscrupulous third parties when it is communicated from a computer system of the customer to a computer system of the vendor. Thieves may also penetrate the security of the vendor's computer system where the financial information is stored to obtain the financial information of large numbers of customers. In networked computer environments where customers purchase from many vendors, the security risk quickly multiplies as a customer's financial information is communicated and stored among an ever greater number of computer systems.

One prior art approach has attempted to address these shortcomings by centralizing the billing function (whereby the customer is charged and remits payment for goods and/or services purchased) at the customer's Internet Access Provider (ISP). This approach is taught by U.S. Pat. No. 5,794,221 and U.S. Pat. No. 6,188,994 B1, both to Egendorf. A drawback of this approach is that it does not reflect the natural manner in which most customers are accustomed to shopping, and it places the ISP in the awkward role of charging for and disbursing funds for a wide variety of goods and/or services that have nothing to do with the ISP's core function of providing Internet access.

SUMMARY

In a method of purchasing online, a client device of a customer communicates a purchase selection which is received by a vendor computer system. The vendor computer system, in response, communicates a cost of the purchase selection and fund confirmation address to the client device. The client device communicates a payment authorization for the cost that is received by a fund guardian. The client device also communicates biometric information. The fund guardian confirms the availability of sufficient funds to pay the cost. The biometric information is applied along with a stored biometric print to authenticate the customer. The vendor computer system communicates a fund confirmation address which is received by the fund guardian. When sufficient funds are available to pay the cost, and when the customer is authenticated, the fund guardian communicates a fund confirmation to the vendor computer system at the fund confirmation address.

DRAWINGS

DESCRIPTION

In the following figures and description, like numbers refer to like elements. References to "one embodiment" or "an embodiment" do not necessarily refer to the same embodiment, although they may.

Figure 1:
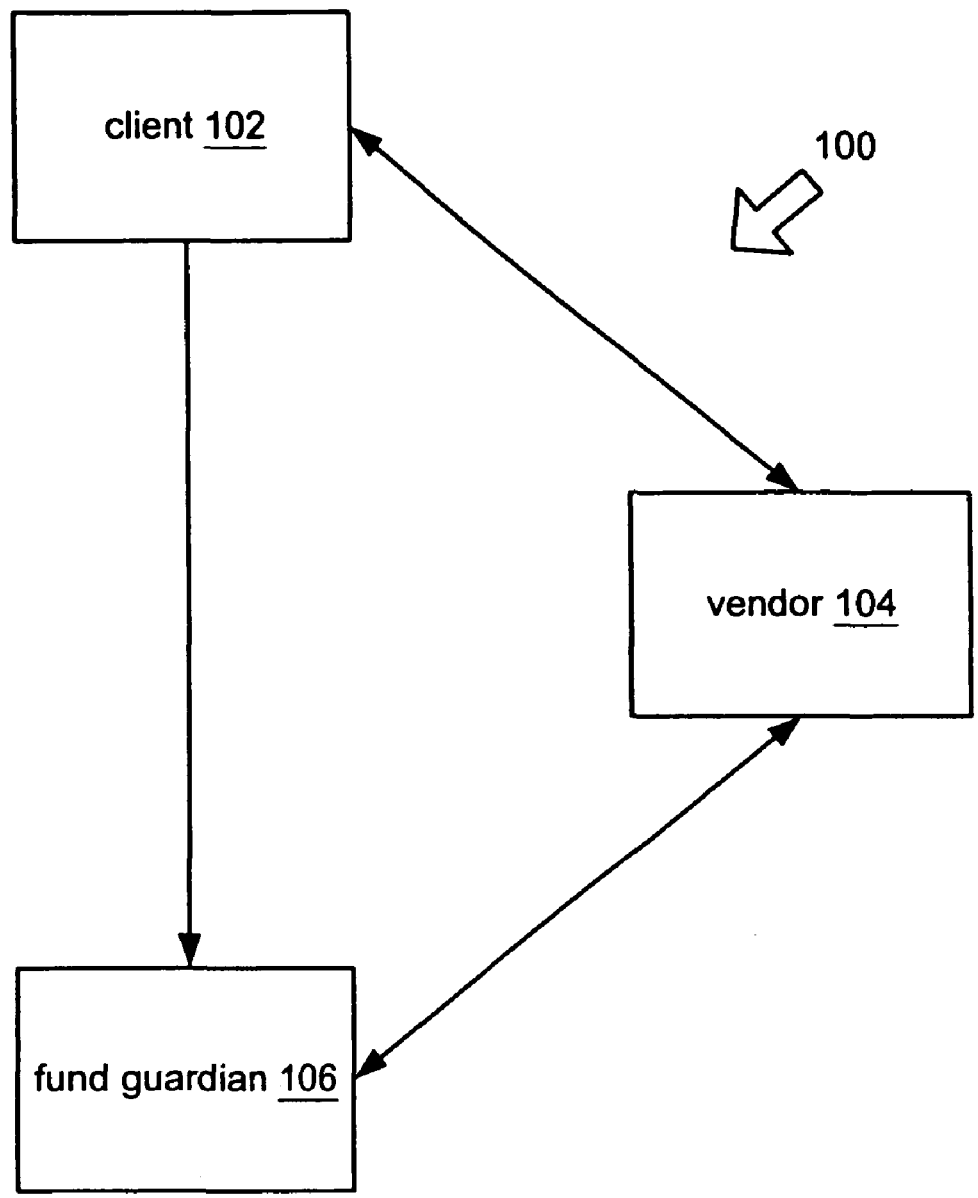
FIG. 1 is a block diagram of an embodiment of a system for online shopping.

With reference to FIG. 1, an embodiment 100 of a system for online purchasing includes a client device 102 operated by a customer to make a purchase online. The client device 102 may be a computer system such as a personal computer, a handheld computer, a mobile telephone, and so on. Herein, a computer or computer system is any device or collection of devices comprising at least one processor and memory, the memory to store instructions and data for execution and/or manipulation by the processor. Exemplary computers and computer systems are personal computers, server computers, handheld and palm-type computers, mobile phones with data processing capabilities, data centers, and web sites.

The client 102 communicates with a vendor computer system 104 via a network. In other words, the client 102 communicates "online". The network may comprise copper or optical conductors, and/or wireless channels. The network may comprise other computer systems and switching and routing systems to route data signals between computer systems. The Internet, working in conjunction with private wireless access providers, is one example of a network. Details of the network are omitted so as not to obscure the description of the present invention.

The vendor 104 provides the client 102 with product selections for purchase and, in the case of content, software, and other information-based products, for download to the client 102.

Both the client 102 and the vendor 104 communicate with a fund guardian 106. The fund guardian 106 is any computer system that maintains access to the customer's funds—for example, a credit or debit card system, an escrow system, a banking system, a system comprising electronic wallet software, and so on. During a purchase transaction, the client 102, vendor 104, and fund guardian 106 communicate to confirm payment for the products or services purchased. The communication is performed in a manner that does not involve the exchange of sensitive client financial information, such as credit and debit card numbers.

Figure 2:
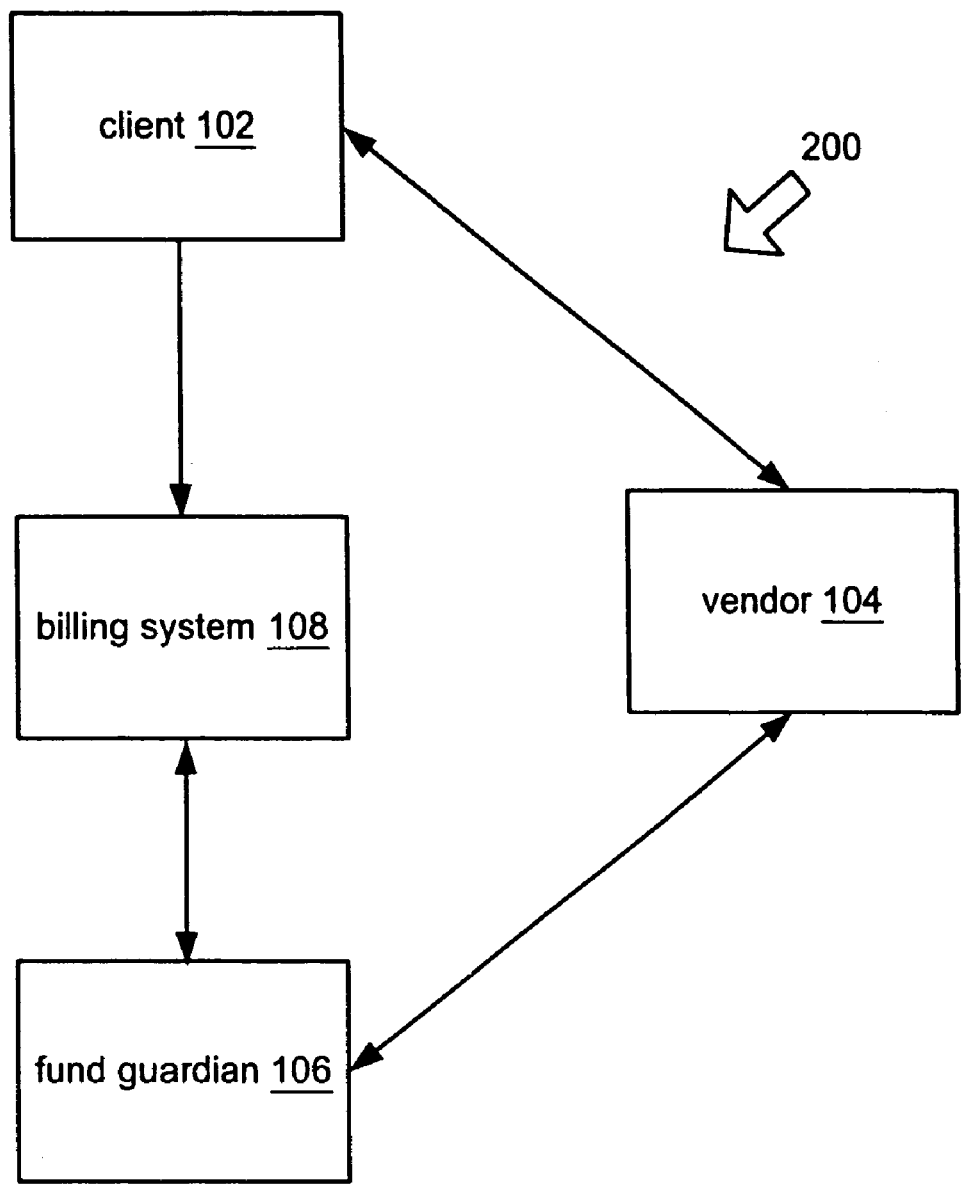
FIG. 2 is a block diagram of another embodiment of a system for online shopping.

With reference to FIG. 2, another embodiment 200 of a system for online purchasing involves a billing computer system 108. The billing system 108 may operate to suspend network access charges during a period of time while the client 102 is downloading content-based products, such as movies, music, and software. For example, in prepaid wireless access plans, the billing system 108 may suspend the billing of the customer's wireless access account during a time while a download is in progress.

Figure 3:
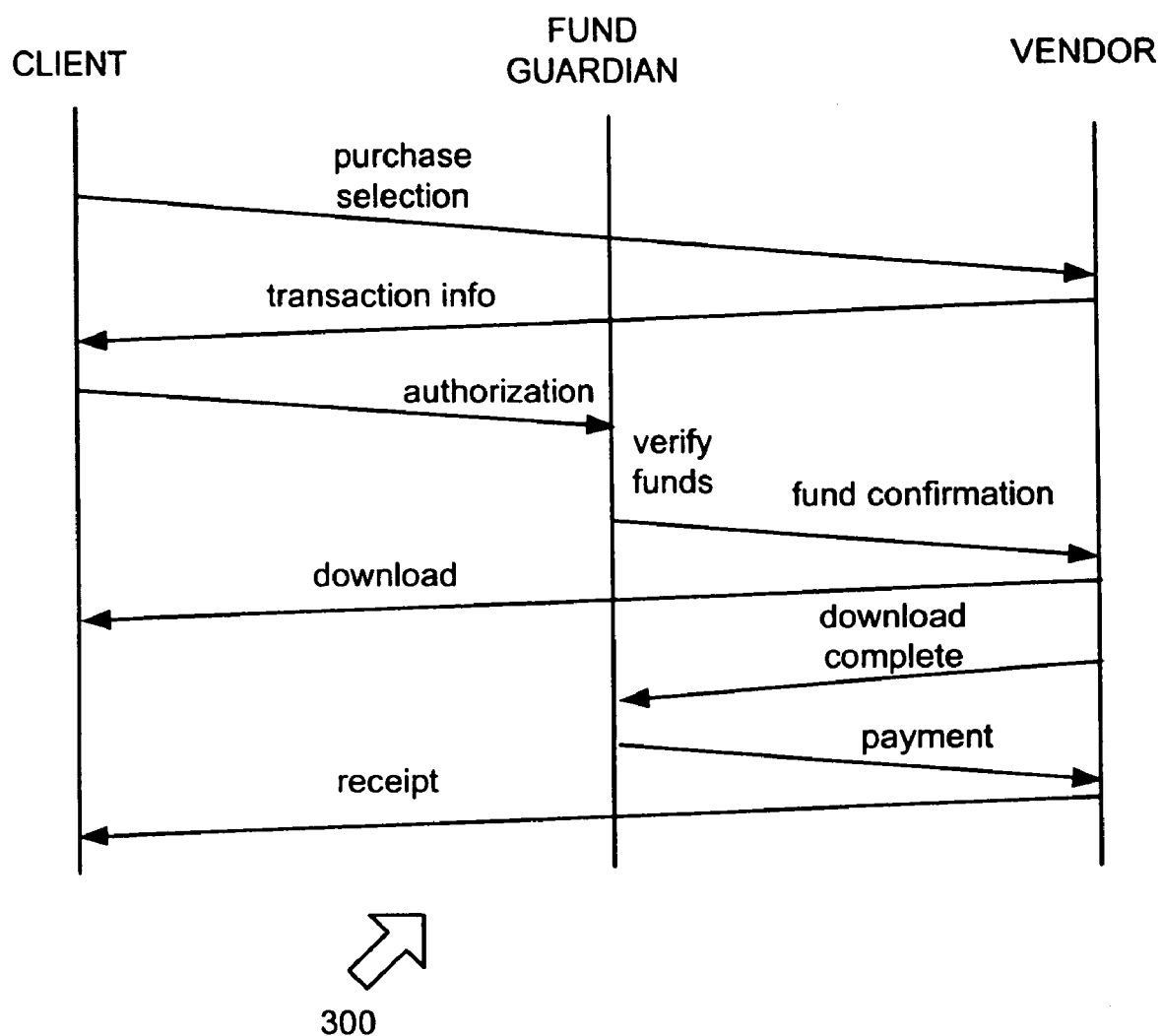
FIG. 3 is a message exchange diagram illustrating an embodiment of a process of shopping online.

With reference to FIG. 3, an embodiment 300 of a method to purchase online begins with a purchase selection by the client device. The purchase selection is communicated to the vendor computer system, which generates and communicates transaction information in response. (One embodiment of transaction information is described in conjunction with FIG. 5.) The client communicates a payment authorization to the fund guardian and the fund guardian verifies that sufficient customer funds are available to satisfy the transaction. Details of an embodiment of a payment authorization are provided in conjunction with FIG. 6. The fund guardian communicates a fund confirmation to the vendor, indicating that sufficient funds are available to complete the transaction. Details of an embodiment of a fund confirmation are provided in conjunction with FIG. 7.

If the product selection identifies a content-based product, a download of the product may then proceed from the vendor. Upon completion of the download, a receipt may be communicated from the vendor to the client. The vendor may also notify the fund guardian that the download is complete, so that the fund guardian can debit the customer's account and arrange for the transfer of payment to the vendor.

If for some reason the download does not complete, perhaps due to a broken network connection or equipment failure, then the vendor may not provide a receipt nor notify the fund guardian that the download is complete, and the customer's account is not charged.

If the product is not content-based, arrangements may be made to ship the product to the customer via mail or commercial carrier. In this case, the vendor may simply communicate to the fund guardian that the customer's account should be charged for the purchase.

Figure 4:
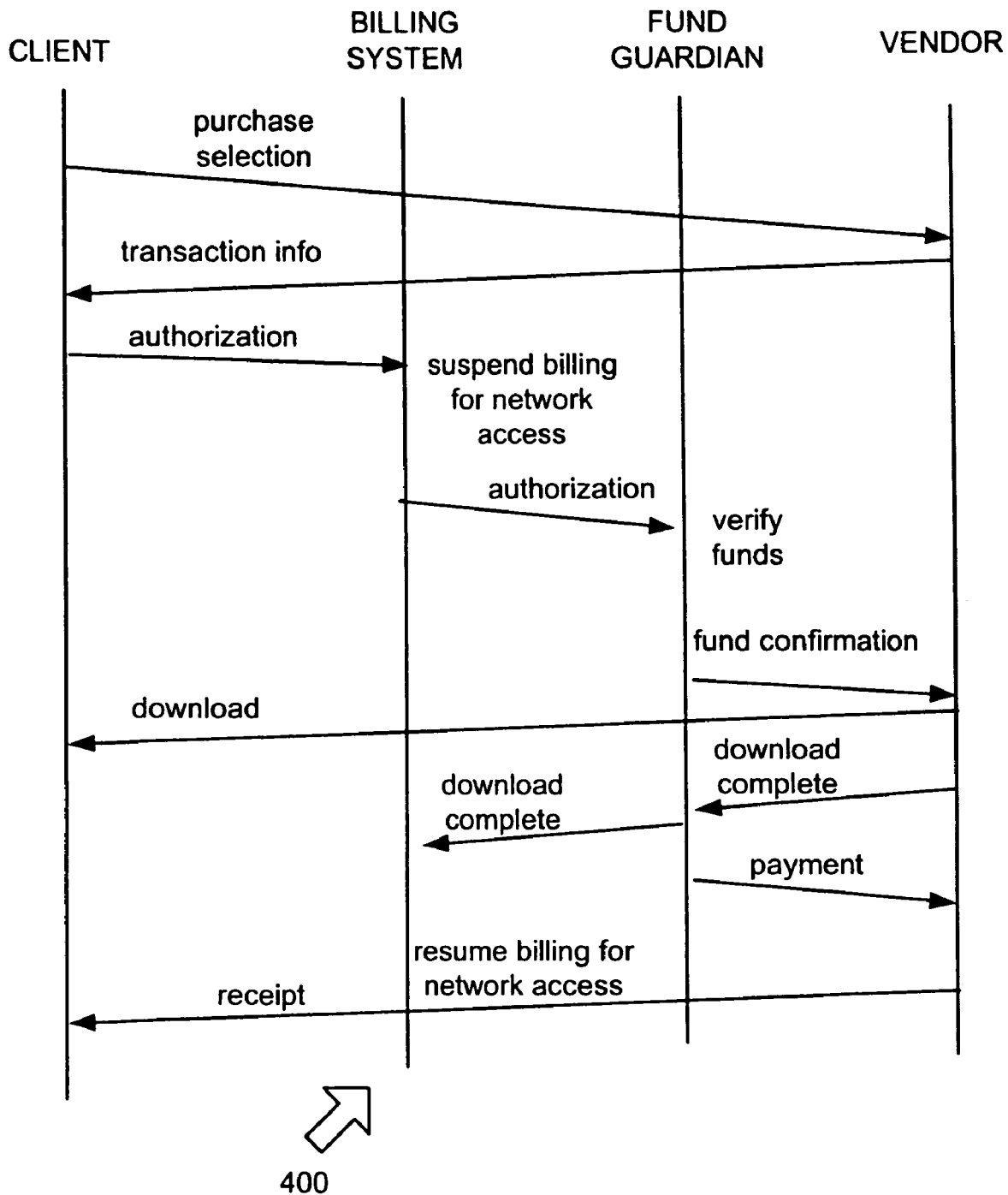
FIG. 4 is a message exchange diagram illustrating another embodiment of a process of shopping online.

With reference to FIG. 4, an embodiment 400 of a method to purchase online begins with a purchase selection by the client device. The method 400 may be particularly useful in situations where network access charges are applied according to the time or volume of data that the customer consumes online. The purchase selection is communicated to the vendor computer system, which generates and communicates transaction information in response. The client communicates a payment authorization to the billing system, which suspends billing for network access and communicates the payment authorization to the fund guardian. The fund guardian verifies that sufficient customer funds are available to satisfy the transaction. The fund guardian communicates a fund confirmation to the vendor, indicating that sufficient funds are available to complete the transaction.

If the product selection identified a content-based product, a download of the product may then proceed from the vendor. Upon completion of the download, a receipt may be communicated from the vendor to the client. The vendor may also notify the fund guardian that the download is complete, so that the fund guardian can debit the customer's account and arrange for the transfer of payment to the vendor. The fund guardian may communicate to the billing system an indication that the download completed, and the billing system may in response resume charging the customer's account for network access time.

The method 400 may prove especially useful in prepaid wireless access accounts, where the customer has prepaid for a certain amount of wireless network access time or data traffic. Suspending network access charges during a download may avoid the unfortunate situation where the customer's network access connection is terminated during a download due to exhaustion of the customer's prepaid account.

Those skilled in the art will appreciate that various computer systems and devices may intervene in the communications between the client device, vendor computer system, fund guardian, and billing system in the various embodiments. For example, the fund confirmation address may be communicated by the vendor computer system and received by the fund guardian, but in the process the fund confirmation address may be received and communicated by any number of other computer systems, switches, routers, and so forth. Alternate embodiments may employ various intermediaries in the communications between the client device, vendor computer system, billing system, and fund guardian.

Figure 5:
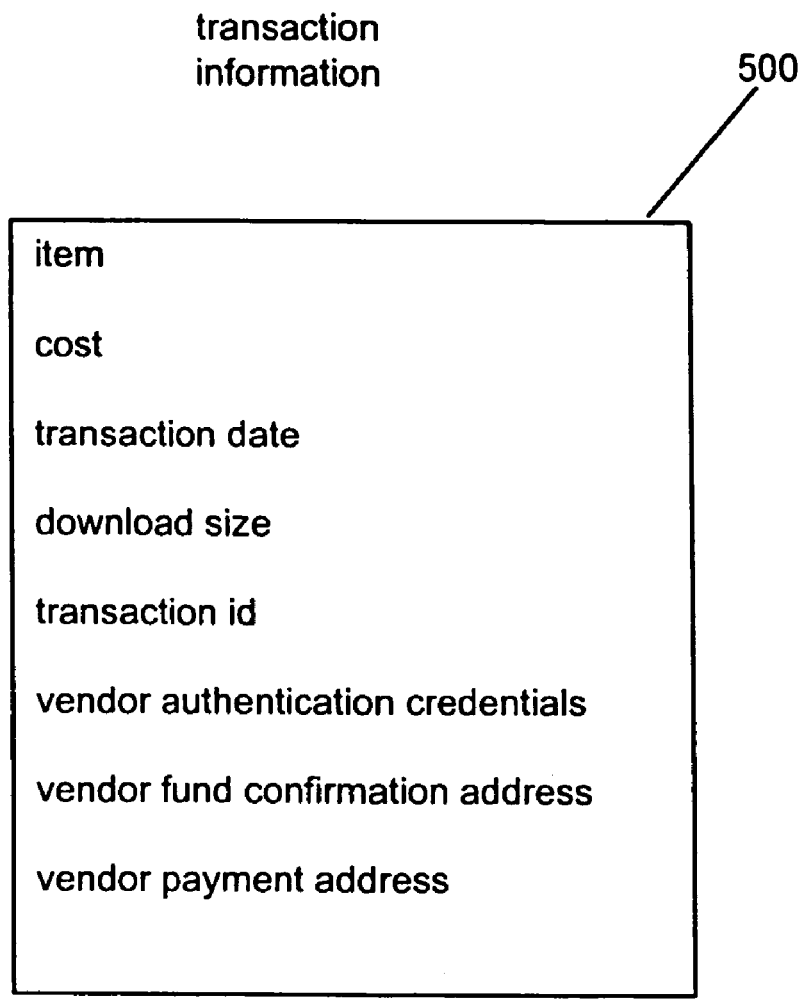
FIG. 5 is a block diagram illustrating an embodiment of transaction information.

With reference to FIG. 5, an embodiment 500 of transaction information includes an identification and/or description of the item or items purchased (products or services) and the cost. A transaction date may also be included. Where the item involves a download, the size of the download may be included.

A transaction id identifies the transaction. Of course, the transaction could be identified by way of a combination of the transaction information, such as by forming a unique combination of the transaction time and date, items purchased, and customer information. In general, it is sufficient that the transaction information comprises enough information to uniquely identify the transaction.

The transaction information may include vendor authentication credentials that help establish the vendor's identity. Digital signatures and certificates are examples of vendor authentication credentials. Including vendor authentication credentials in the transaction information may help the customer establish trust that the transaction information is from the vendor and that the transaction information has not been altered from the form in which it was generated.

A vendor confirmation address is included in the transaction information. The vendor confirmation address comprises a network address to which the funds confirmation may be communicated from the funds guardian to the vendor. For example, on Internet Protocol (IP) networks, the vendor address may comprise an IP address and a port number. A vendor payment address may also be included, or it may be the same as the vendor confirmation address. The vendor payment address is a network address with which the funds guardian may communicate in order to effect a funds transfer that constitutes payment to the vendor for the item purchased by the customer.

Figure 6:
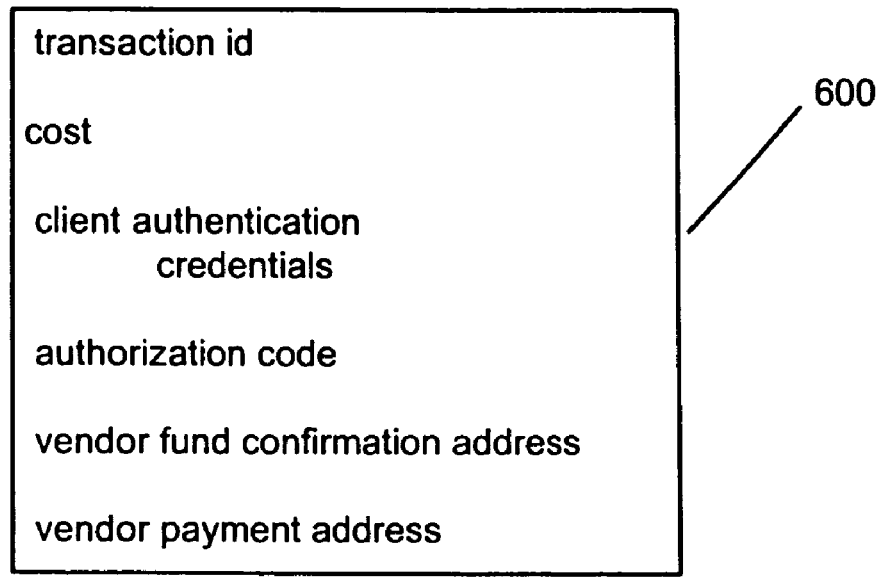
FIG. 6 is a block diagram illustrating an embodiment of a payment authorization.

With reference to FIG. 6, an embodiment 600 of a payment authorization includes the transaction id and cost comprised by the transaction information. The transaction id may be used to associate the payment authorization with the transaction. The payment authorization may also comprise customer authorization credentials to establish trust that the payment authorization is from the customer and has not been altered during communication from the client to the funds guardian or billing system. A digital signature may also help establish non-repudiation of the origin of the payment authorization.

An authorization code may be included to uniquely identify the payment authorization from other such authorizations. The authorization code may be used to associate the payment authorization with the later communication of the funds confirmation to the vendor.

The payment authorization further comprises the vendor fund confirmation address. Upon receiving the payment authorization and verifying that sufficient funds are available, the fund guardian may communicate the fund confirmation to the vendor fund confirmation address. The vendor payment address may also be included in the payment authorization.

Figure 7:
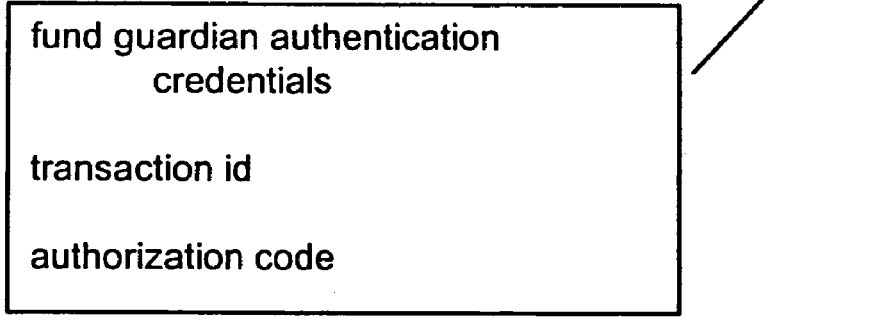
FIG. 7 is a block diagram illustrating an embodiment of a fund confirmation.

With reference to FIG. 7, an embodiment 700 of a fund confirmation includes the transaction id to associate the fund confirmation with the transaction, and may also include the authorization code to associate the fund confirmation with the payment authorization. The fund confirmation further comprises fund guardian authentication credentials, which help establish trust that the fund guardian is the origin of the fund confirmation.

Figure 8:
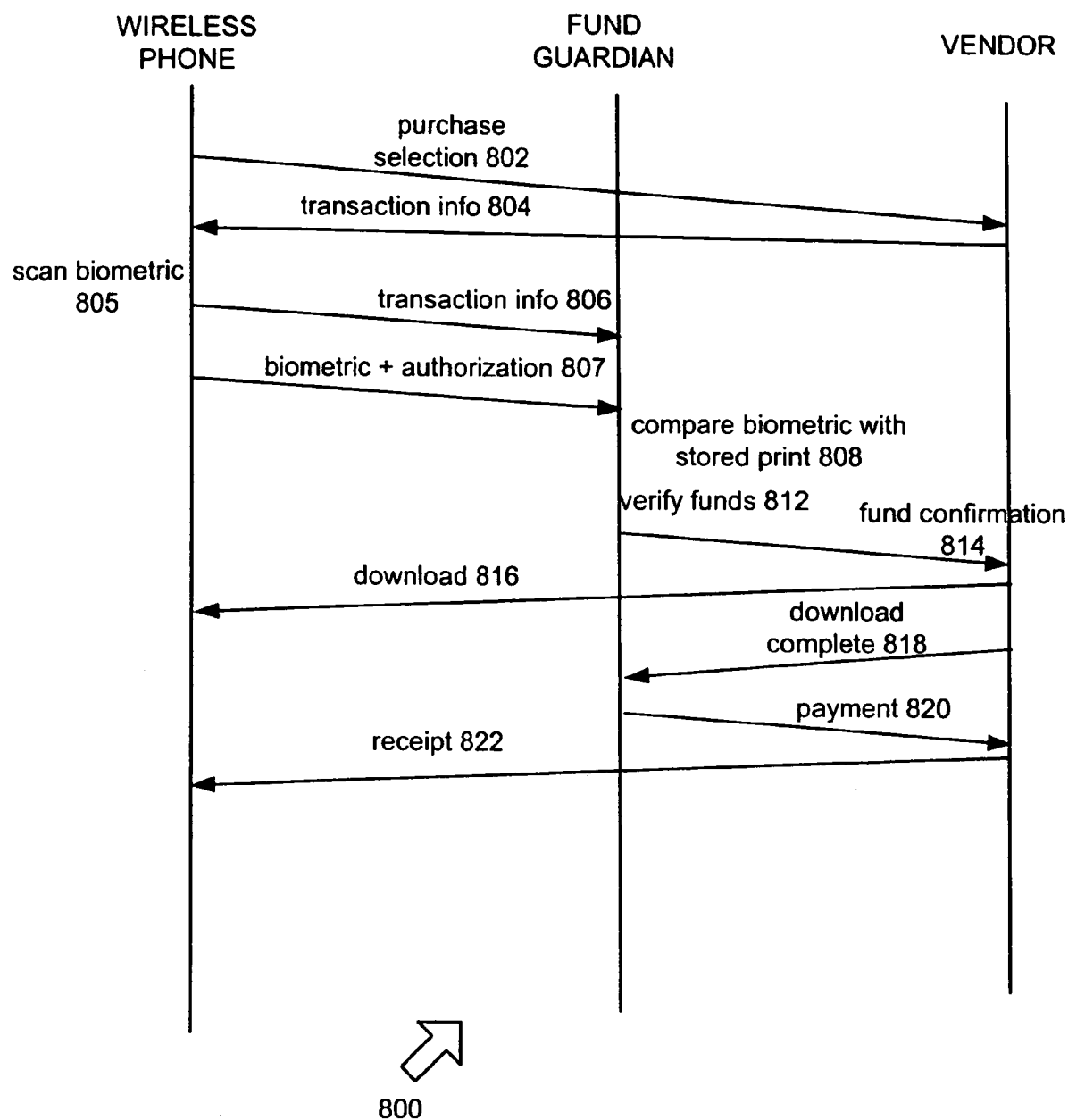
FIG. 8 is a message exchange diagram illustrating an embodiment of a process of shopping online.

With reference to FIG. 8, an embodiment 800 of a method to purchase online begins with a purchase selection by a wireless phone, such as a cell phone. Other client devices, such as personal, handheld, palm, and laptop computers, could be employed instead of the wireless phone. The purchase selection is communicated at 802 to the vendor computer system, which at 804 generates and communicates transaction information in response. At 805 the phone performs a biometric scan, such as a voice scan, fingerprint scan, retinal scan, and so on. The scan reads biometric information about the user of the phone. In one embodiment, the biometric scan is performed by the user speaking words into a microphone of the phone. In one embodiment, the transaction information (or some portion thereof) are communicated at 806 separately from the biometric information and authorization. In another embodiment, at 807, the phone communicates biometric information from the scan and a payment authorization to the fund guardian separately from the transaction information. All three (biometric information, transaction information, authorization) may be communicated together, in some combination, or separately. At 808 the fund guardian compares the biometric information with a stored biometric print to authenticate the user of the phone. A biometric print is any biometric information that represents the identity of a person. In one embodiment, the biometric print comprises spoken words by the user of the wireless phone (e.g. the customer). At 812 the fund guardian verifies that sufficient customer funds are available to satisfy the transaction. At 814 the fund guardian communicates a fund confirmation to the vendor, indicating that sufficient funds are available to complete the transaction.

If the product selection identifies a content-based product, a download of the product may then proceed from the vendor at 816. At 818 the vendor may notify the fund guardian that the download is complete, so that, at 820, the fund guardian can debit the customer's account and arrange for the transfer of payment to the vendor. At 822 a receipt may be communicated from the vendor to the client.

If for some reason the download does not complete, perhaps due to a broken network connection or equipment failure, then the vendor may not provide a receipt nor notify the fund guardian that the download is complete, and the customer's account is not charged.

If the product is not content-based, arrangements may be made to ship the product to the customer via mail or commercial carrier. In this case, the vendor may simply communicate to the fund guardian that the customer's account should be charged for the purchase.

In another embodiment, the biometric print is recorded and stored in the wireless phone. The wireless device performs the comparison of the biometric print with the biometric data to authenticate the user. The wireless device may then provide the fund guardian with an indication of successful authentication, along with or separately from authorization of the transaction and transaction information.

Figure 9:
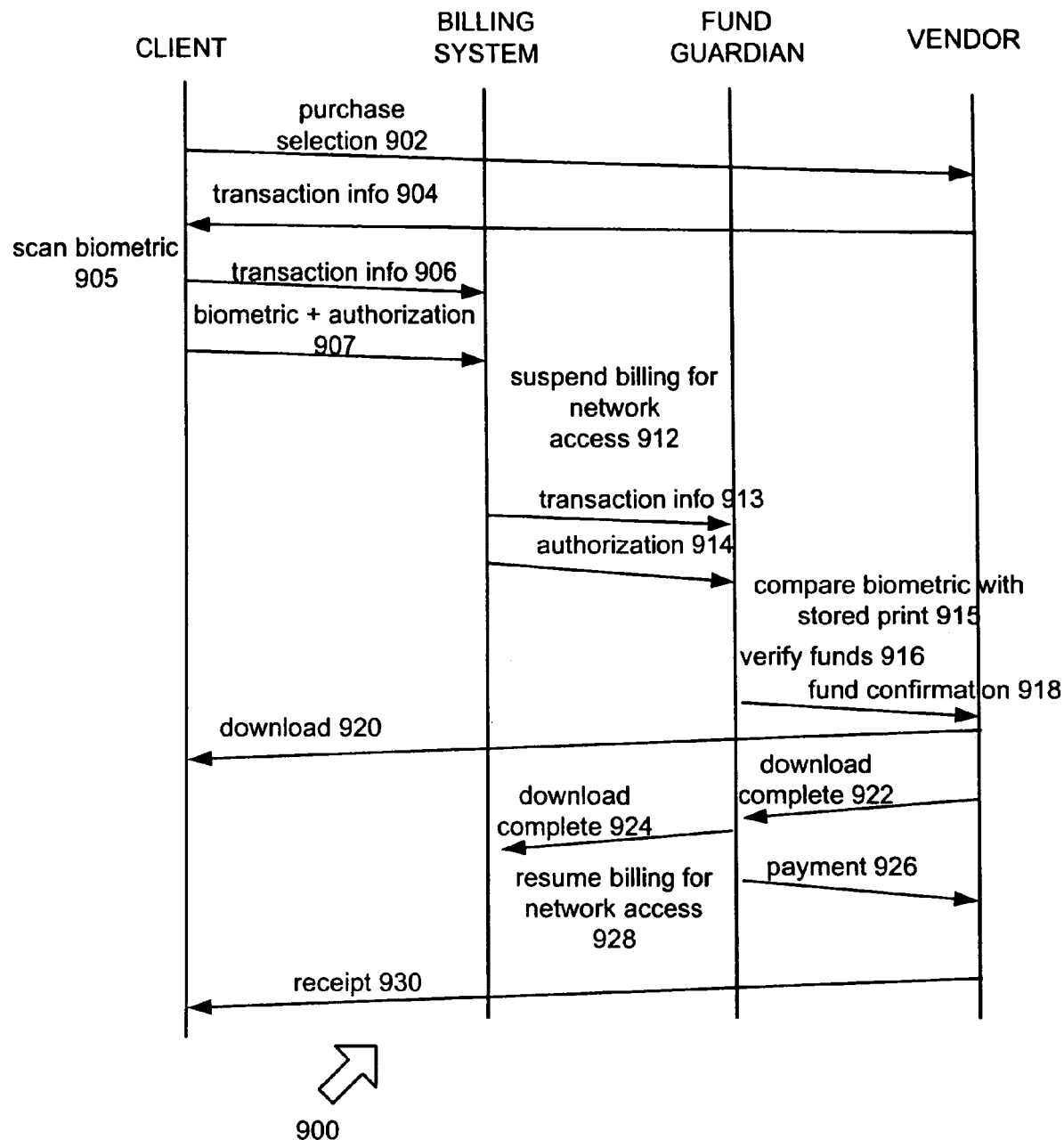
FIG. 9 is a message exchange diagram illustrating another embodiment of a process of shopping online.

With reference to FIG. 9, an embodiment 900 of a method to purchase online begins with a purchase selection by a wireless phone, such as a cell phone. Other client devices, such as personal, handheld, palm, and laptop computers, could be employed instead of the wireless phone. The method 900 may be particularly useful in situations where network access charges are applied according to the time or volume of data that the customer consumes online. The purchase selection is communicated at 902 to the vendor computer system, which at 904 generates and communicates transaction information in response. At 905 the phone performs a biometric scan, such as a voice scan, fingerprint scan, retinal scan, and so on. In one embodiment, the biometric scan is performed by the user speaking words into a microphone of the phone. In one embodiment, the transaction information (or some portion thereof) are communicated at 906 separately from the biometric information and authorization. In another embodiment, at 907, the phone communicates biometric information from the scan and a payment authorization to the billing system separately from the transaction information. All three (biometric information, transaction information, authorization) may be communicated together, in some combination, or separately at any stage of the process. At 912 the billing system suspends billing for network access, and at 913 and 914 communicates the payment authorization and transaction information to the fund guardian. Of course, this information could also be sent together.

At 915 the fund guardian compares the biometric information with a stored biometric print to authenticate the user of the phone. In one embodiment, the biometric print comprises spoken words by the user of the wireless phone. At 916 the fund guardian verifies that sufficient customer funds are available to satisfy the transaction. At 918 the fund guardian communicates a fund confirmation to the vendor, indicating that sufficient funds are available to complete the transaction.

If the product selection identifies a content-based product, a download of the product may then proceed from the vendor at 920. At 922 the vendor may notify the fund guardian that the download is complete, and this indication may be passed along to the billing system at 924. The billing system may at 928 resume charging the customer's account for network access time. At 926 the fund guardian may debit the customer's account and arrange for the transfer of payment to the vendor. At 930 a receipt may be communicated from the vendor to the client.

If for some reason the download does not complete, perhaps due to a broken network connection or equipment failure, then the vendor may not provide a receipt nor notify the fund guardian that the download is complete, and the customer's account is not charged.

If the product is not content-based, arrangements may be made to ship the product to the customer via mail or commercial carrier. In this case, the vendor may simply communicate to the fund guardian that the customer's account should be charged for the purchase.

In another embodiment, the biometric print is recorded and stored in the wireless phone. The wireless device performs the comparison of the biometric print with the biometric data to authenticate the user. The wireless device may then provide the billing system with an indication of successful authentication, along with or separately from authorization of the transaction and transaction information. The billing system may communicate the authorization and authentication to the fund guardian.

In another embodiment, the billing system receives the biometric information and makes the comparison with the voice print to perform authentication of the phone user.

The method 900 may prove especially useful in prepaid wireless access accounts, where the customer has prepaid for a certain amount of wireless network access time or data traffic. Suspending network access charges during a download may avoid the unfortunate situation where the customer's network access connection is terminated during a download due to exhaustion of the customer's prepaid account.

Those skilled in the art will appreciate that various computer systems and devices may intervene in the communications between the client device, vendor computer system, fund guardian, and billing system in the various embodiments. For example, the fund confirmation address may be communicated by the vendor computer system and received by the fund guardian, but in the process the fund confirmation address may be received and communicated by any number of other computer systems, switches, routers, and so forth. Alternate embodiments may employ various intermediaries in the communications between the client device, vendor computer system, billing system, and fund guardian.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A method of purchasing online comprising:
communicating, by a customer device, a purchase selection to a vendor computer system;
communicating, by the vendor computer system in response, a cost of the purchase selection, a transaction ID, transaction time information, and a fund confirmation address to the customer device;
communicating, by the customer device, a payment authorization for the cost to a billing system, the billing system suspending network access charges during the online purchase;
communicating, by the customer device, the transaction ID and the transaction time information to the fund guardian;
communicating, by the billing system, the payment authorization to a fund guardian, the fund guardian to confirm the availability of sufficient funds to pay the cost, wherein the fund guardian is one of a banking system and an escrow system;
communicating, by the vendor computer system, to the fund guardian that the download completed successfully; and
transferring, by the fund guardian, funds to the vendor computer system in response to the download completing successfully; and
communicating, by the fund guardian when sufficient funds are available to pay the cost, a fund confirmation to the fund confirmation address without using the customer device as an intermediary,
wherein all communications are performed without exchanging credit card or debit card information and,
wherein the billing system resumes network access charges upon receipt of the purchase selection by the customer device.

2. The method of claim 1 further comprising:
enabling, by the vendor computer system, a download to the customer device in response to the fund confirmation.

3. The method of claim 1 further comprising:
communicating, by the client device, biometric information to the fund guardian, the biometric information applied along with a stored biometric print to authenticate the customer, wherein the communicating the fund confirmation to the fund confirmation address occurs when the customer is authenticated.

4. The method of claim 1 further comprising:
receiving, by the customer device, biometric information and comparing the biometric information with a stored biometric print to authenticate the customer; and
communicating, by the customer device, an indication of authentication to the fund guardian, wherein the communicating the fund confirmation to the fund confirmation address occurs when the indication indicates that the customer is authenticated.

5. A method of transacting online comprising:
communicating, from a customer device, a purchase selection for receipt by a vendor computer system;
receiving, at the customer device, a cost of the purchase selection, a transaction ID, transaction time information, and a fund confirmation address from the vendor computer system;
suspending network access charges at a billing system;
communicating, from the customer device and for receipt by a fund guardian via the billing system, the fund confirmation address, the transaction ID, the transaction time information, and a payment authorization for the cost of the purchase selection for use by the fund guardian to provide a fund confirmation to the fund confirmation address without using the client device as an intermediary, wherein the fund guardian is one of a banking system and an escrow system;
communicating, by the vendor computer system, to the fund guardian that the download completed successfully; and
transferring, by the fund guardian, funds to the vendor computer system in response to the download completing successfully;
wherein all communications are performed without exchanging credit card or debit card information and,
wherein the billing system resumes network access charges upon receipt of the purchase selection by the customer device.

6. The method of claim 5 further comprising:
receiving content which is the subject of the purchase selection from the vendor computer system as a result of the fund guardian providing the fund confirmation for the cost to the fund confirmation address.

7. The method of claim 5 further comprising communicating biometric information for receipt by the fund guardian.

8. The method of claim 5 further comprising:
comparing biometric information with a stored biometric print to produce an indication of authentication; and
communicating the indication of authentication for receipt by the fund guardian.

9. The method of claim 5 wherein the customer device is a handheld computer or a mobile telephone.

10. A method of transacting online, comprising:

receiving a purchase selection communicated by a customer device;

communicating to the customer device, in response to receiving the purchase selection, a cost of the purchase selection, a transaction ID, transaction time information, and a fund confirmation address for subsequent communication by the customer device to a fund guardian for a user of the customer device, wherein the fund guardian is a banking system;

receiving at a billing system a fund confirmation for the cost of the purchase selection, the billing system suspending network access charges during the online purchase;

receiving at the fund confirmation address a fund confirmation for the cost of the purchase selection, wherein the fund confirmation is communicated without using the customer device as an intermediary; and enabling a download by the customer device in response to receiving the fund confirmation;

communicating to the fund guardian that the download completed successfully; and receiving funds from the fund guardian in response to the download completing successfully;

wherein all communications are performed without exchanging credit card or debit card information and wherein the billing system resumes network access charges upon receipt of the download by the customer device.

11. The method of claim 10 wherein the fund confirmation is received from the fund guardian.

* * * * *